United States Patent
Zhang et al.

(10) Patent No.: US 10,290,245 B2
(45) Date of Patent: May 14, 2019

(54) METHODS AND APPARATUSES FOR TEST AND CANCELLATION OF RESIDUAL IMAGE

(71) Applicants: BOE Technology Group Co., Ltd., Beijing (CN); Beijing BOE Optoelectronics Technology Co., Ltd., Beijing (CN)

(72) Inventors: Hao Zhang, Beijing (CN); Wei Sun, Beijing (CN); Lingyun Shi, Beijing (CN); Haiwei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/306,532

(22) PCT Filed: Jan. 12, 2016

(86) PCT No.: PCT/CN2016/070670
§ 371 (c)(1),
(2) Date: Oct. 25, 2016

(87) PCT Pub. No.: WO2017/016198
PCT Pub. Date: Feb. 2, 2017

(65) Prior Publication Data
US 2017/0178553 A1   Jun. 22, 2017

(30) Foreign Application Priority Data
Jul. 28, 2015   (CN) .......................... 2015 1 0450701

(51) Int. Cl.
*G09G 3/00*   (2006.01)
*G09G 3/36*   (2006.01)
(Continued)

(52) U.S. Cl.
CPC ........... *G09G 3/006* (2013.01); *G09G 3/3611* (2013.01); *G02F 1/1309* (2013.01);
(Continued)

(58) Field of Classification Search
CPC ..... G09G 2310/027; G09G 2320/0257; G09G 2320/029; G09G 3/006; G09G 3/3611
See application file for complete search history.

(56) References Cited

U.S. PATENT DOCUMENTS 7,750,875 B2 *   7/2010   Kim .................... G09G 3/3233
                                                          345/82
7,956,634 B2   6/2011   Zhao
(Continued)

FOREIGN PATENT DOCUMENTS

CN   101425246 A   5/2009
CN   101650480 A   2/2010
(Continued)

OTHER PUBLICATIONS

International Search Report and Written Opinion, including English translation of Written Opinion, for International Application No. PCT/CN2016/070670, dated Apr. 28, 2016, 13 pages.
(Continued)

*Primary Examiner* — Afroza Chowdhury
(74) *Attorney, Agent, or Firm* — Westman, Champlin & Koehler, P.A.

(57) ABSTRACT

The embodiments of the present disclosure provide a method and an apparatus for test and cancellation of residual image, capable of solving the problem associated with inaccurate evaluation of residual image and difficulty in accurate modification. The method for residual image test according to the present disclosure comprises: playing a residual image test picture on a display panel; applying a first fixed level signal to a pixel electrode of the display
(Continued)

panel; and obtaining potential information of the pixel electrode via a data line.

16 Claims, 6 Drawing Sheets

(51) Int. Cl.
    *G02F 1/13*         (2006.01)
    *G02F 1/1333*    (2006.01)

(52) U.S. Cl.
    CPC ............ *G02F 2001/133397* (2013.01); *G02F 2203/30* (2013.01); *G09G 2310/027* (2013.01); *G09G 2320/029* (2013.01); *G09G 2320/0257* (2013.01); *G09G 2320/045* (2013.01)

(56) References Cited

U.S. PATENT DOCUMENTS

| | | | | |
|---|---|---|---|---|
| 2004/0095402 A1* | 5/2004 | Nakano | ................ | G06F 3/0412 346/102 |
| 2006/0273345 A1* | 12/2006 | Lee | .................... | G09G 3/3648 257/147 |
| 2007/0296672 A1* | 12/2007 | Kim | .................... | G09G 3/3233 345/92 |
| 2008/0100609 A1* | 5/2008 | Lee | ...................... | G09G 3/3233 345/212 |
| 2010/0033205 A1 | 2/2010 | Zhao | | |
| 2010/0214273 A1 | 8/2010 | Shirouzu et al. | | |
| 2013/0016132 A1* | 1/2013 | Chiang | ................. | G09G 3/006 345/690 |
| 2015/0187291 A1 | 7/2015 | Jang | | |

FOREIGN PATENT DOCUMENTS

| | | |
|---|---|---|
| CN | 104485058 A | 4/2015 |
| CN | 104536177 A | 4/2015 |
| CN | 104950494 A | 9/2015 |
| JP | 2015-87608 A | 5/2015 |
| WO | 2005/054933 A2 | 6/2005 |

OTHER PUBLICATIONS

Second Office Action, including Search Report, for Chinese Patent Application No. 201510450701.X, dated May 3, 2018, 13 pages.
Extended European search report, pursuant to Rule 62 EPC, for European Patent Application No. 16781657.8, dated Nov. 15, 2018, 12 pages.

* cited by examiner

Fig. 1

(PRIOR ART)

METHODS AND APPARATUSES FOR TEST AND CANCELLATION OF RESIDUAL IMAGE

CROSS-REFERENCE TO RELATED APPLICATION

This application is a Section 371 National Stage Application of International Application No. PCT/CN2016/070670, filed on 12 Jan. 2016, which has not yet published, and claims priority to Chinese Patent Application No. 201510450701.X, filed with SIPO on Jul. 28, 2015, the contents of which are incorporated herein by reference in their entirety.

TECHNICAL FIELD

The present disclosure relates to display technology, and more particularly, to methods and apparatuses for test and cancellation of residual image.

BACKGROUND

Figure 2A:
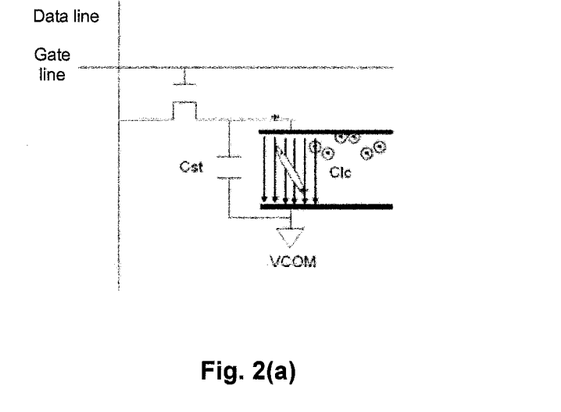
FIG. 2(a) is a schematic diagram showing a driving electrical field and an ion accumulation before a picture change.
Figure 2B:
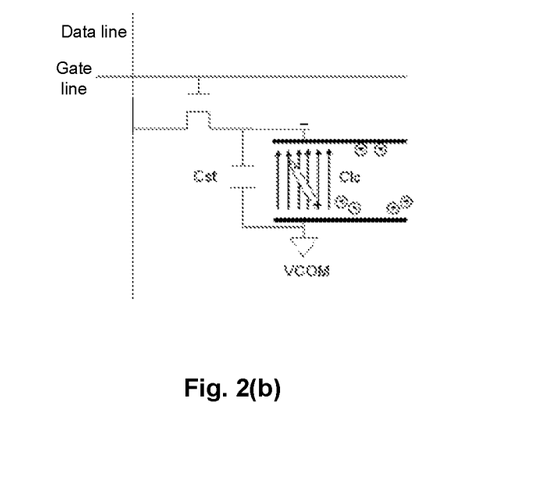
FIG. 2(b) is a schematic diagram showing a driving electrical field and an ion accumulation after a picture change.

A residual image, which is a common defect of Liquid Crystal Displays (LCDs) nowadays, refers to a phenomenon that, when a single picture has been displayed on a LCD for a long time and suddenly changed to another picture, the display content of the last picture can be indistinctly visible. This is because, during manufacture of a LCD, due to presence of various factors, there may be some ions in a liquid crystal box, as shown in FIG. 2(a). While displaying, these ions move in direction of positive and negative electrical fields (i.e., driving electrical fields). When the movement energy of the ions applied by the positive and negative electrical fields is not uniform, these ions will accumulate on one side gradually. When the accumulated ions reach a certain concentration, the transmission rate of the panel will be changed. When the display is suddenly changed to the next picture, as shown in FIG. 2(b), some of the accumulated ions cannot be scattered immediately and will maintain the original picture, resulting in a residual image.

Figure 1:
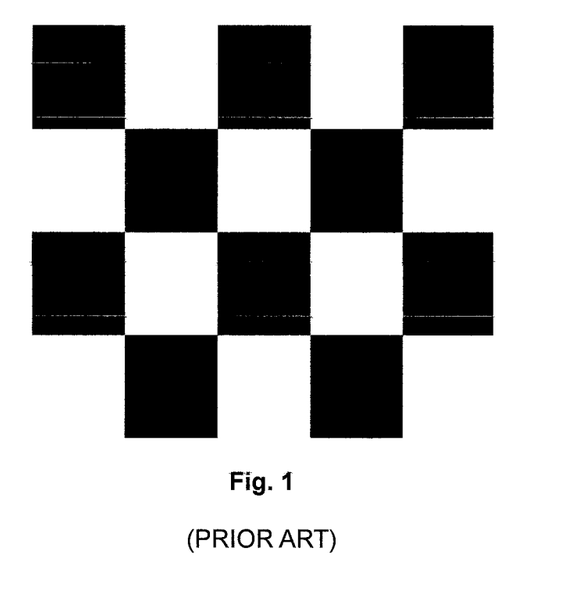
FIG. 1 shows a picture used in a conventional residual image test.

Conventionally, a residual image can typically be tested as follows. A 3*3 grid picture as shown in FIG. 1 is displayed for a long time (typically about 1 hour) and then changed to a gray scale picture and, in this case, a residual image phenomenon will occur. An image residual level of the display can be evaluated based on the time length required for the residual image to disappear. The time length required for the residual image to disappear is typically obtained by optically observing a surface luminance of the panel, and then modified based on the evaluation. There are problems that the residual image level does not improve or degrade obviously, the evaluation is not accurate enough and it is difficult for accurate modification.

SUMMARY

The embodiments of the present disclosure provide methods and an apparatuses for test and cancellation of residual image, capable of solving the problem associated with inaccurate evaluation of residual image and difficulty in accurate modification.

In order to achieve the above object, the following solutions are provided according to the embodiments of the present disclosure.

According to an embodiment, a method for residual image test is provided. The method comprises: playing a residual image test picture on a display panel; applying a first fixed level signal to a pixel electrode of the display panel; and obtaining potential information of the pixel electrode via a data line.

The step of obtaining the potential information of the pixel electrode via the data line comprises: connecting the data line with the pixel electrode by turning on all gate lines on the display panel, such that the data line outputs a signal corresponding to the potential information of the pixel electrode.

Preferably, the method further comprises, prior to obtaining the potential information of the pixel electrode via the data line: disconnecting the data line from the pixel electrode and then applying a second fixed level signal to the data line, until the potential level of the data line becomes a second fixed level; and floating the data line.

Optionally, the second fixed level signal is a common voltage signal.

Optionally, the step of applying the first fixed level signal to the pixel electrode of the display panel comprises: applying the first fixed level signal to the pixel electrode via the data line by turning on all gate lines on the display panel.

Optionally, the first fixed level signal is a ground voltage signal.

Preferably, the residual image test picture has a consistent color in a direction along which the data line extends.

Optionally, the first fixed level signal is applied to the pixel electrode of the display panel by: configuring the display panel to play a gray scale image in which all pixels have the same gray scale value or an all-black image.

According to another embodiment, a method for residual image cancellation is provided. The method comprises: Step S1: obtaining potential information of a pixel electrode using the above method of residual image test; and Step S2: adjusting a gray scale voltage based on the obtained potential information.

Preferably, Step S1 and Step S2 are performed repeatedly until the potential information of the pixel electrode satisfies a predetermined condition.

Optionally, Step S2 comprises: calculating a difference between a potential level of the pixel electrode and a first fixed level by comparing the obtained potential information with the first fixed level signal; and adjusting the gray scale voltage by: decreasing the gray scale voltage by the difference when the potential level of the pixel electrode is higher than the first fixed level, or increasing the gray scale voltage by the difference when the potential level of the pixel electrode is lower than the first fixed level, if the potential information of the pixel electrode is obtained by: first disconnecting the data line from the pixel electrode, then applying a second fixed level signal to the data line, until the potential level of the data line becomes a second fixed level, and then floating the data line; connecting the data line with the pixel electrode by turning on all gate lines on the display panel, such that the data line outputs a signal corresponding to the potential information of the pixel electrode.

Optionally, in Step S2, the gray scale voltage is adjusted by adjusting γ-voltage.

Optionally, the potential information of the pixel electrode satisfying the predetermined condition comprises: a difference between the potential level of the pixel electrode and the first fixed level satisfying a predetermined value.

On the other hand, an apparatus for residual image test is provided according to an embodiment of the present disclosure. The apparatus comprises: a playing unit configured to play a residual image test picture on a display panel; an applying unit configured to, after playing the residual image test picture on the display panel, apply a first fixed level signal to a pixel electrode of the display panel; and an obtaining unit configured to obtain potential information of the pixel electrode via a data line.

In particular, the obtaining unit comprises: a gate line control module configured to connect the data line with the pixel electrode by turning on all gate lines on the display panel, prior to obtaining the potential information of the pixel electrode via the data line; and an obtaining module configured to obtain the potential information of the pixel electrode via the data line.

Preferably, the gate line control module is further configured to disconnect the data line from the pixel electrode by turning off the gate lines, prior to applying a second fixed level signal to the data line; and, after completing application of the second fixed level signal and while the data line is floated, connect the data line with the pixel electrode by turning on the gate lines. The obtaining unit further comprises: a fixed level application module configured to apply, after disconnecting the data line from the pixel electrode, a second fixed level signal to the data line, until the potential level of the data line becomes a second fixed level; and a data line control module configured to float the data line after completing application of the second fixed level signal.

Optionally, the second fixed level signal is a common voltage signal.

Optionally, the first fixed level signal is a ground voltage signal.

Preferably, the residual image test picture has a consistent color in a direction along which the data line extends.

Preferably, the applying unit is further configured to apply to the display panel a gray scale image in which all pixels have the same gray scale value or an all-black image.

According to an embodiment of the present disclosure, an apparatus for residual image cancellation is provided. The apparatus comprises: the above apparatus for residual image test; and a gray scale voltage adjusting unit configured to adjust a gray scale voltage based on the potential information obtained by the apparatus for residual image test.

The apparatus further comprises: a terminating unit configured to turn off the apparatus for residual image test and the gray scale voltage adjusting unit when the potential information of the pixel electrode satisfies a predetermined condition.

The obtaining unit of the apparatus for residual image test comprises: a gate line control module configured to disconnect the data line from the pixel electrode by turning off the gate lines, prior to applying a second fixed level signal to the data line; and, after completing application of the second fixed level signal and while the data line is floated, connect the data line with the pixel electrode by turning on the gate lines; a fixed level application module configured to apply, after disconnecting the data line from the pixel electrode, a second fixed level signal to the data line, until the potential level of the data line becomes a second fixed level; a data line control module configured to float the data line after completing application of the second fixed level signal; and an obtaining module configured to obtain the potential information of the pixel electrode via the data line. The gray scale voltage adjusting unit comprises: a comparing module configured to calculate a difference between the potential level of the pixel electrode and a first fixed level by comparing the obtained potential information with the first fixed level signal; and a gray scale voltage adjusting module configured to decrease the gray scale voltage by the difference when the potential level of the pixel electrode is higher than the first fixed level, or increase the gray scale voltage by the difference when the potential level of the pixel electrode is lower than the first fixed level.

Optionally, the potential information of the pixel electrode satisfying the predetermined condition comprises: a difference between the potential level of the pixel electrode and the first fixed level satisfying a predetermined value.

With the methods and apparatuses for test and cancellation of residual image according to the embodiments of the present disclosure, a residual image test picture is played on a display panel first, a first fixed level signal is then applied to a pixel electrode of the display panel, and then potential information of the pixel electrode is obtained via a data line. Since the potential information contains information on polarity and amount of ions accumulated on the panel material to be tested after the test picture has been changed (which is the main reason for which the residual image occurs), the residual image level determination and modification can be performed accordingly. According to the present disclosure, the original optical problem in the residual image test can be converted to the electrical domain for measurement. This has a fast feedback and a high accuracy and is capable of solving the problem associated with inaccurate evaluation of residual image and difficulty in accurate modification.

BRIEF DESCRIPTION OF THE DRAWINGS

In order to illustrate the solutions according to the embodiments of the present application clearly, the figures used for description of the embodiments will be introduced briefly here. It is apparent to those skilled in the art that the figures described below only illustrate some embodiments of the present disclosure and other figures can be obtained from these figures without applying any inventive skills.

REFERENCE SIGNS

10—apparatus for residual image test;
11—playing unit;
12—applying unit;
13—obtaining unit;
131—gate line control module;
132—fixed level applying module;
133—data line control module;
134—obtaining module;
20—gray scale voltage adjusting unit;
30—terminating unit.

DETAILED DESCRIPTION OF THE EMBODIMENTS

In the following, the solutions according to the embodiments of the present disclosure will be described clearly and fully with reference to the figures. Obviously, the embodiments described below are only some, rather than all, of the embodiments. Starting from the embodiments of the present disclosure, those skilled in the art can obtain other embodiments with applying any inventive skills. All these embodiments are to be encompassed by the scope of the present disclosure.

Embodiment 1

Figure 3:
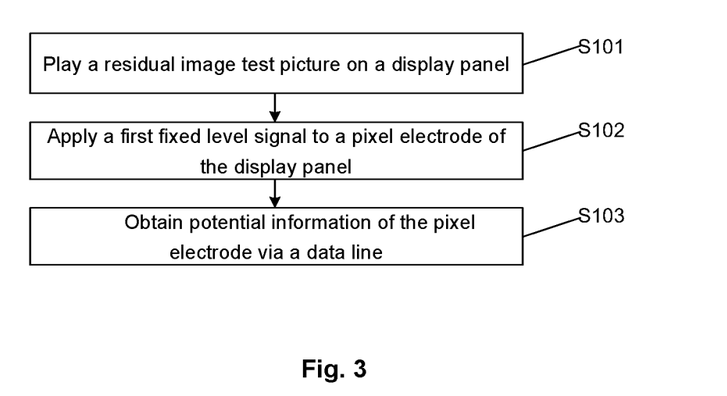
FIG. 3 is a first flowchart illustrating a method for residual image test according to a first embodiment of the present disclosure.

According to the embodiment of the present disclosure, a method for residual image test is provided. As shown in FIG. 3, the method includes the following steps.

At step S101, a residual image test picture is played on a display panel.

This embodiment is not limited to any specific test picture. Any picture for residual image test as known by those skilled in the art can be used. However, the test picture is required to be maintained for a long predetermined time (typically 1 hour) which depends on the display panel's requirements on residual image in the design.

Figure 4:
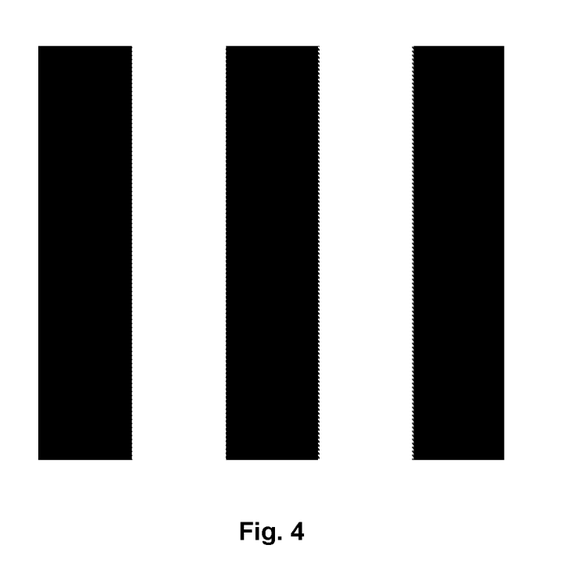
FIG. 4 shows a picture used in the residual image test in the first embodiment of the present disclosure.

For example, the residual image test picture in this step can be a picture having black and white blocks interlaced and arranged in a 3*3 grid, as shown in FIG. 1. However, preferably, as shown in FIG. 4, in order to avoid degradation of test accuracy due to interference between neighboring pixels, in this embodiment, a picture having a consistent color in a direction along which the data line extends. That is, the residual image test picture is preferably an image having vertical strips.

At step S102, a first fixed level signal is applied to a pixel electrode of the display panel.

In this step, the first fixed level signal is applied to each pixel electrode. The first fixed level signal can be any signal having a constant level. However, for convenience in calculation and connection in subsequent steps, the first fixed level signal is typically selected as a ground signal GND. In particular, this step can be performed by turning on all gate lines on the display panel, such that the data line outputs a signal corresponding to the potential information of the pixel electrode.

Alternatively, this step can be performed by configuring the display panel to play a gray scale image in which all pixels have the same gray scale value or an all-black image. In this case, equivalently, a fixed level signal is applied to each pixel electrode of the display panel uniformly.

At step S103, potential information of the pixel electrode is obtained via a data line.

Figure 5:
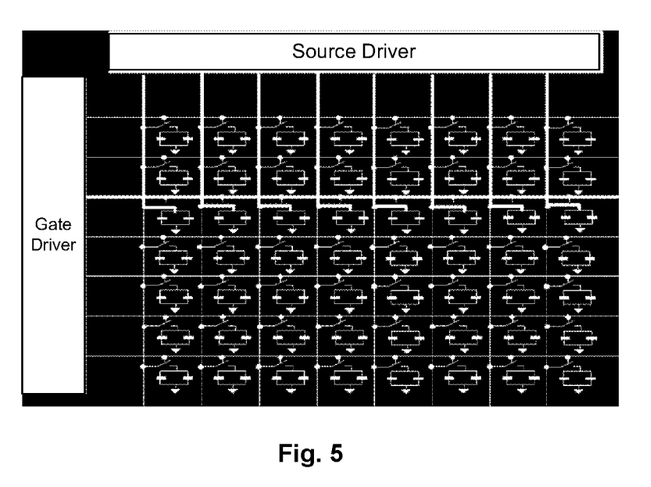
FIG. 5 is a schematic diagram showing the potential information of the pixel electrode obtained via a data line in the first embodiment of the present disclosure.

As shown in FIG. 2(b), after the picture has been changed (the picture on the display panel has been changed in the step S102), the accumulated ions cannot be scattered immediately, which is the primary reason for which the residual image occurs. In this step, as shown in FIG. 5, the potential information of the pixel electrode in each pixel is collected via the data line. That is, the potential information contains information on polarity and amount of ions that cannot be scattered immediately (also referred to as accumulated ions) on the panel material to be tested. If the residual image test is performed before installation of a source driving circuit, the data line can be used directly as the transmission line for the collected information on the accumulated ions. If the residual image test is performed after installation of the source driving circuit, the data line needs to be disconnected from the source driving circuit (e.g., by floating the data line) before the collected information on the accumulated ions can be obtained via the data line. Further, in this step, the gate lines on the display panel needs to be turned on (all at one time or by individual regions). The data line can be used as the transmission line for the collected information on the accumulated ions only when the data line is connected with the pixel electrode.

Unlike the conventional solutions, in this embodiment, an induction voltage on the pixel electrode is collected via the data line and the residual image level can be determined based on the polarity and amplitude of the induction voltage. In this way, the optical problem can be converted to the electrical domain for measurement. This has a fast feedback and a high accuracy and is capable of solving the problem associated with inaccurate evaluation of residual image and difficulty in accurate modification.

Figure 6A:
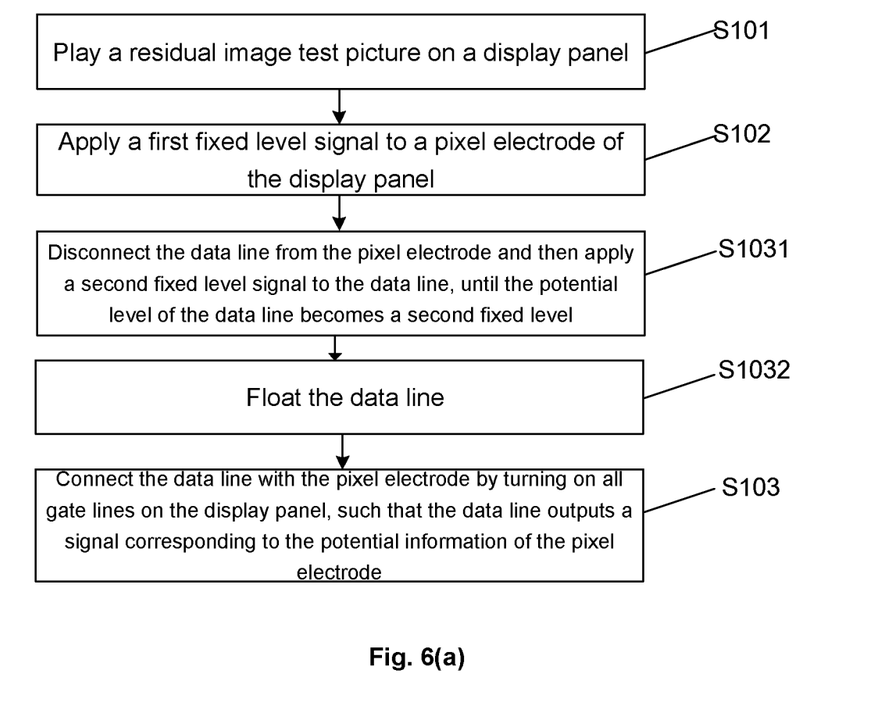
FIG. 6(a) is a second flowchart illustrating a method for residual image test according to the first embodiment of the present disclosure.

Further, in this embodiment, another method for residual image test is provided. As shown in FIG. 6(a), in this test method, the above step S103 includes connecting the data line with the pixel electrode by turning on all gate lines on the display panel, such that the data line outputs a signal corresponding to the potential information of the pixel electrode.

Preferably, the method further includes the following steps prior to obtaining the potential information of the pixel electrode via the data line.

At step S1031, the data line is disconnected from the pixel electrode and then a second fixed level signal is applied to the data line, until the potential level of the data line becomes a second fixed level.

In particular, in this step, all the gate lines can be turned off to disconnect the data line with the pixel electrode, and then the second fixed level signal is applied to the data line, until the potential level of the data line becomes the second fixed level. Here, the second fixed level signal can preferably be, but not limited to, a common voltage signal Vcom. Alternatively, the second fixed level signal can be any other signal having a constant level.

The primary purpose of this step is to allow the data line to reach a constant level, so as to later induce a residual image electrical field in a pixel box more accurately. Here, the residual image electrical field refers to an electrical field that is created by the accumulated ions and mainly produces the residual image. Also, with this step, the impact on the test by the voltage on the common voltage line can be removed, so as to increase the accuracy of the test.

Then, at step S1032, the data line is floated. The main purpose of this step is to disconnect the data line from the connection for actively applying a voltage and typically includes disconnecting the data line from a source driving circuit, as a preparation for the next step. In this case, in the next step the information on the accumulated ions can be collected using the data line.

In the next step in this embodiment, the data line is connected with the pixel electrode by turning on all gate lines on the display panel, such that the data line outputs a signal corresponding to the potential information of the pixel electrode. With the method for residual image test according to this embodiment, the impact on the test by the voltage on the common voltage line can be removed, so as to increase the accuracy of the test.

Figure 6B:
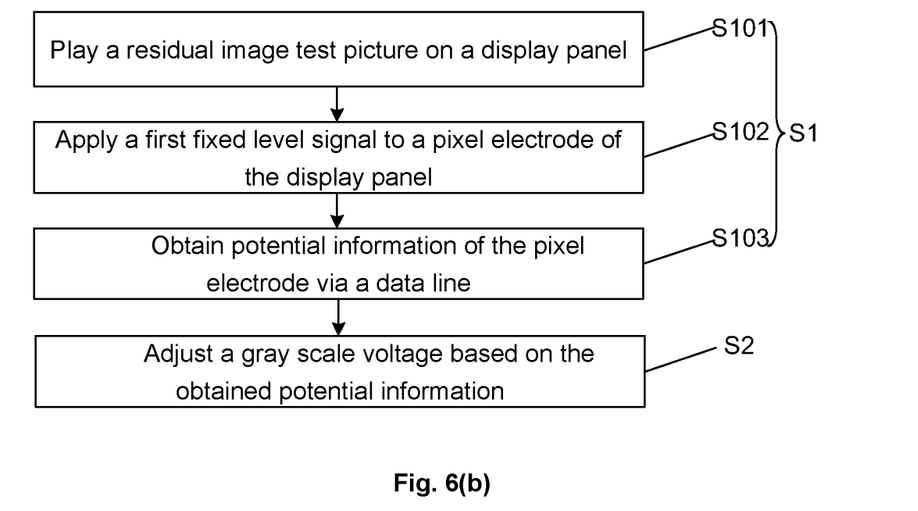
FIG. 6(b) is a first flowchart illustrating a method for residual image cancellation according to the first embodiment of the present disclosure.

Based on the above method for residual image test, according to an embodiment of the present disclosure, a method for residual image cancellation is also provided. As shown in FIG. 6(b), the method includes the following steps.

At step S1, potential information of a pixel electrode is obtained using the above method of residual image test. This step has been explained above and the description thereof will be omitted here.

At step S2, a gray scale voltage is adjusted based on the obtained potential information. In this step, the gray scale voltage can be adjusted by adjusting γ-voltage, as the gray scale voltage is obtained from γ-voltage.

In this step, necessary information processing operations, such as amplification, Analog-to-Digital conversion, filtering and interference cancellation, and the like, are performed to extract information reflecting polarity and amount of the accumulated ions from the obtained potential information, for inputting to a display driving unit (e.g., a source driver) for adjusting the gray scale voltage accordingly. Preferably, the gray scale voltage can be adjusted by and for individual regions, so as to suppress or cancel the residual image phenomenon.

If in the step S1 the potential information of the pixel electrode is obtained in accordance with the above steps S1031~S1033, then this step (Step S2) includes: calculating a difference between the potential level of the pixel electrode and a first fixed level by comparing the obtained potential information with the first fixed level signal; and adjusting the gray scale voltage by: decreasing the gray scale voltage by the difference when the potential level of the pixel electrode is higher than the first fixed level, or increasing the gray scale voltage by the difference when the potential level of the pixel electrode is lower than the first fixed level. In this embodiment, the gray scale voltage is adjusted based on the difference between the potential level of the pixel electrode and the first fixed level, so as to mitigate or eliminate the problem of residual image.

Figure 7:
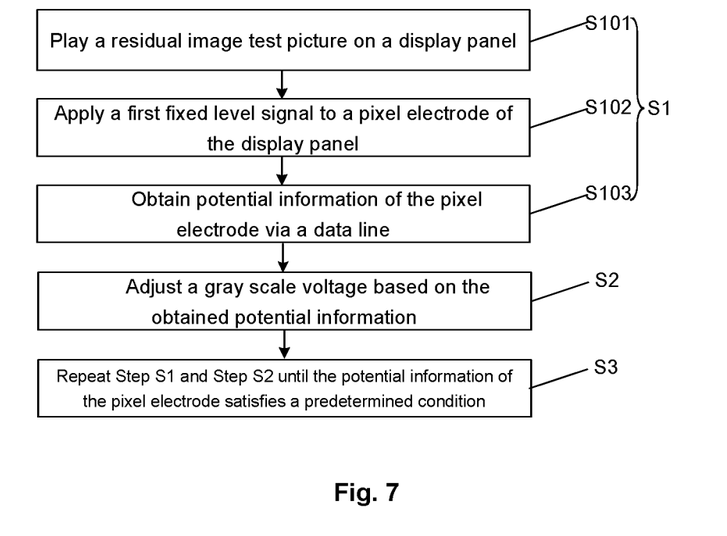
FIG. 7 is a second flowchart illustrating a method for residual image cancellation according to the first embodiment of the present disclosure.

Further, as shown in FIG. 7, the above method for residual image cancellation further includes: Step S3: repeating Step S1 and Step S2 until the potential information of the pixel electrode satisfies a predetermined condition. In this step, with multiple adjustments until the potential information of the pixel electrode satisfies the predetermined condition, a higher modification criterion and a higher display effect quality can be achieved. It is also possible for automatic adjustment and automatic cancellation of residual image. Here, the predetermined condition depends on a minimum requirement criterion on the residual image problem in the design and can be determined according to experiences or experiments.

Optionally, in the case described above where the gray scale voltage is adjusted based on the potential level of the pixel electrode and the first fixed level, the predetermined condition in Step S3 can be a difference between the potential level of the pixel electrode and the first fixed level satisfying a predetermined value. That is, in Step S3, Step S1 and Step S2 are repeated, until the difference between the potential level of the pixel electrode and the first fixed level satisfies predetermined value. Here, the predetermined value depends on a minimum requirement criterion on the residual image problem in the design and can be determined according to experiences or experiments.

In order to facilitate understanding of the above methods for residual image test and cancellation by those skilled in the art, detailed description will be given below with reference to specific examples.

Step 1: A test picture as shown in FIG. 4 is displayed for a long time (e.g., 1 hour). The displayed picture has a consistent color in a direction along which the data line extends.

Step 2: All gate lines are turned on and a ground signal (GND signal) is applied to the data line for a sufficiently long time, such that the voltage on the pixel electrode and the voltage on the data line are substantially the same.

Step 3: All gate lines are turned off, such that the data line that is originally connected to the source driving circuit is shorted to the common voltage, so as to ensure that there is no voltage difference between the data line and the common electrode. Then, the data line is floated. Here, the data line being floated means that no more data signal is applied to the data line and, instead, the data line is used as a transmission line for collecting signals associated with the residual image problem.

Step 4: The data line is connected to the pixel electrode by turning on all gate lines on the panel and the data line and the pixel electrode are used as test sensors for the accumulated ions. Since the ion accumulation within the liquid crystal panel will produce an induction voltage at the floated data line and the pixel electrode, the information about the residual image problem can be obtained by testing the induction voltage on the data line and the pixel electrode (i.e., the potential information of the pixel electrode).

Step 5: A reverse compensation is applied to the original gray scale voltage based on the polarity and amplitude of the induction voltage produced on the pixel electrode, so as to cancel the voltage bias accumulated by these ions, thereby mitigating or canceling the residual image phenomenon.

The reverse compensation in this step means that, if the polarity of the induction voltage produced on the pixel electrode is positive and the potential level of the pixel electrode is higher than the first fixed level, the gray scale voltage is decreased by the amplitude of the induction voltage; or if the polarity of the induction voltage produced on the pixel electrode is negative and the potential level of the pixel electrode is lower than the first fixed level, the gray scale voltage is increased by the amplitude of the induction voltage.

In the above test method according to this embodiment, since the charge stored in the pixel has been released in Step 2, the residual charge electrical field within the pixel box produces an electrical field and the data line, as a sensor unit (in this case, the function of the data line to output a level actively needs to be disabled, typically by floating the data line), is connected to the pixel electrode, so as to reflect the electrical field produced by the residual charge in the pixel. If, in Step 2, another fixed level signal instead of the ground signal (GND signal) is outputted to the data line, then in Step 5 this fixed level signal needs to be subtracted from the induction voltage produced on the pixel electrode and then the reverse compensation is applied to the original gray scale voltage based on the polarity and amplitude of the resulting difference, so as to cancel the voltage bias accumulated by these ions, thereby mitigating or canceling the residual image phenomenon.

The above test method according to this embodiment can further include repeating the test and adjustment of the gray scale voltage, until the ion accumulation problem (i.e., the residual image phenomenon) is solved. Since there may be errors in the accuracy of the testing of the residual image electrical field induction within the liquid crystal box, it is required to determine whether to repeat the steps of testing and adjusting the gray scale voltage by determining whether the detected voltage signal is smaller than a predetermined value, which typically depends on the difference of the residual image tolerated by a client.

According to this embodiment of the present disclosure, methods for test and cancellation of residual image are provided. The polarity and amplitude of the accumulated ions on the panel material are measured and the difference between the positive/negative gray scale voltage and the common electrode voltage is reversely compensated for, such that the problem of display residual on the panel can be solved quickly and effectively.

The original optical problem in the residual image test can be converted to the electrical domain for measurement. This has a fast feedback and a high accuracy and can achieve automatic measurement and adjustment functions, capable of solving the problem associated with inaccurate evaluation of residual image and difficulty in accurate modification.

Embodiment 2

Figure 8:
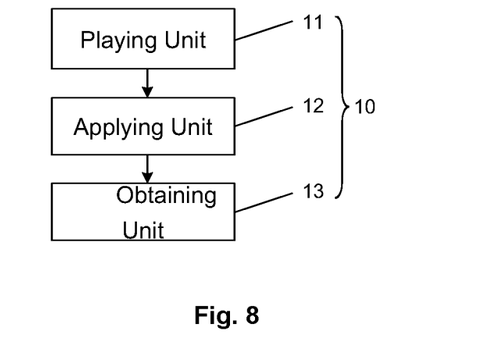
FIG. 8 is a schematic diagram showing a structure of an apparatus for residual image test according to a second embodiment of the present disclosure.

According to this embodiment of the present disclosure, an apparatus 10 for residual image test is provided. As shown in FIG. 8, the apparatus includes: a playing unit 11 configured to play a residual image test picture on a display panel; an applying unit 12 configured to, after playing the residual image test picture on the display panel, apply a first fixed level signal to a pixel electrode of the display panel; and an obtaining unit 13 configured to obtain potential information of the pixel electrode via a data line.

In this embodiment, the playing unit 11 plays the residual image test picture on the display panel and can directly use a driving circuit in the display panel for driving the panel to display. After the residual image test picture is played on the display panel, the applying unit 12 applies the first fixed level signal to the pixel electrode of the display panel. The function of the applying unit 12 can be achieved by the playing unit 11 directly. That is, after playing the residual image test picture, the display panel can continue to play a gray scale image in which all pixels have the same gray scale value or an all-black image. Hence, alternatively, the apparatus 10 for residual image test according to this embodiment can only include the playing unit 11 and the obtaining unit 13. The obtaining unit 13 can be connected with the data line, directly or indirectly, for obtaining via the data line and storing the potential information of the pixel electrode and then performing necessary information processing, e.g., outputting a residual image test result of the panel, e.g., a residual image level.

In particular, the obtaining unit 11 can include a gate line control module 131 configured to connect the data line with the pixel electrode by turning on all gate lines on the display panel, prior to obtaining the potential information of the pixel electrode via the data line; and an obtaining module 134 configured to obtain the potential information of the pixel electrode via the data line.

Figure 9:
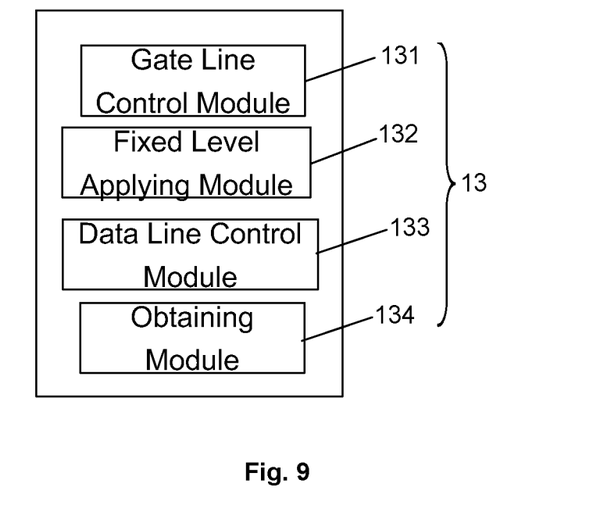
FIG. 9 is a schematic diagram showing a structure of the obtaining unit in the apparatus for residual image test according to the second embodiment of the present disclosure.

In a preferable implementation of this embodiment, as shown in FIG. 9, the gate line control module 131 is further configured to disconnect the data line from the pixel electrode by turning off the gate lines, prior to applying a second fixed level signal to the data line; and, after completing application of the second fixed level signal and while the data line is floated, connect the data line with the pixel electrode by turning on the gate lines. The obtaining unit further includes: a fixed level application module 132 configured to apply, after disconnecting the data line from the pixel electrode, a second fixed level signal to the data line, until the potential level of the data line becomes a second fixed level; a data line control module 133 configured to float the data line after completing application of the second fixed level signal; and an obtaining module 134 configured to obtain the potential information of the pixel electrode via the data line.

In this embodiment, the gate line control module 131 can be implemented using a gate driver directly. The functions of the fixed level application module 132 and the data line control module 133 can be implemented using a source driver directly. It is to be noted that the data line control module 133 floats the data line, after completion of the application of the second fixed level signal, to disable the active voltage application function of the data line, such that the obtaining module 134 can read the potential information of the pixel electrode via the data line. IN the apparatus for residual image cancellation, the data line control module 133 directly switches the output from the data line to a gray scale voltage adjusting unit, such that the obtaining module 134 can directly transfer the potential information of the pixel electrode read from the data line to the gray scale voltage adjusting unit. The gray scale voltage adjusting unit can perform the gray scale voltage adjustment accordingly, thereby mitigating or eliminating the residual image phenomenon.

In this embodiment, with the cooperation of the gate line control module 131, the fixed level application module 132, the data line control module 133 and the obtaining module 134, the data line first reaches a constant level and then the potential information of the pixel electrode is collected via the data line, so as to eliminate the impact on the test by the voltage on the common voltage line and increase the accuracy of the test.

Optionally, the above first fixed level signal is a ground voltage signal, and the above second fixed level signal is a common voltage signal. By using the existing signals directly, it is convenient for connectivity and there is no need for new additional signal lines. This is also convenient for the subsequent calculations.

Preferably, the residual image test picture has a consistent color in a direction along which the data line extends. It is possible to avoid mutual impact between neighboring pixels and improve the accuracy of the test.

Figure 10:
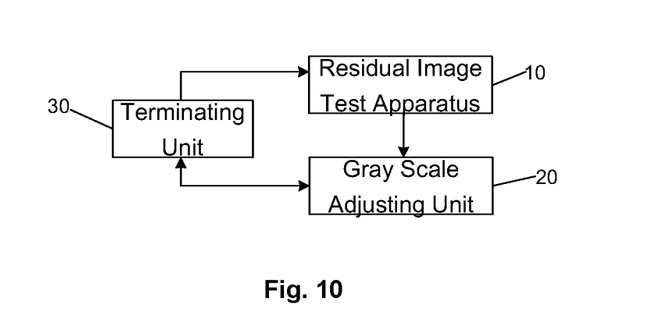
FIG. 10 is a schematic diagram showing a structure of an apparatus for residual image cancellation according to a second embodiment of the present disclosure.

According to an embodiment of the present disclosure, an apparatus for residual image cancellation is provided. As shown in FIG. 10, the apparatus for residual image cancellation includes the apparatus 10 for residual image test as described above; and a gray scale voltage adjusting unit 20 configured to adjust a gray scale voltage based on the potential information obtained by the apparatus 10 for residual image test.

The apparatus for residual image cancellation further includes a terminating unit 30 configured to turn off the apparatus 10 for residual image test and the gray scale voltage adjusting unit 20 when the potential information of the pixel electrode satisfies a predetermined condition.

If the obtaining unit of the apparatus 10 for residual image test operates by first causing the data line to reach a constant level and then collecting the potential information of the pixel electrode via the data line, i.e., if the obtaining unit includes the above gate line control module, fixed level application module, data line control module and obtaining module, accordingly the gray scale voltage adjusting unit includes a comparing module configured to calculate a difference between the potential level of the pixel electrode and a first fixed level by comparing the obtained potential information with the first fixed level signal; and a gray scale voltage adjusting module configured to decrease the gray scale voltage by the difference when the potential level of the pixel electrode is higher than the first fixed level, or increase the gray scale voltage by the difference when the potential level of the pixel electrode is lower than the first fixed level. In this case, the condition for terminating the test and the gray scale voltage adjustment is a difference between the potential level of the pixel electrode and the first fixed level satisfying a predetermined value.

With the methods and apparatuses for test and cancellation of residual image according to the embodiments of the present disclosure, the potential information of the pixel electrode is obtained via the data line and the residual image level determination and modification can be performed accordingly. Since in the embodiments of the present disclosure the original optical problem in the residual image test can be converted to the electrical domain for measurement, the apparatuses for test and cancellation of residual image according to the embodiments of the present disclosure have advantages of a fast feedback and a high accuracy and are capable of solving the problem associated with inaccurate evaluation of residual image and difficulty in accurate modification.

The embodiments in the specification are described in a progressive manner. The same or similar elements of the respective embodiments may refer to each other. The description of any embodiment focuses on the difference compared with other embodiments. In particular, the embodiments of the system correspond to the embodiments of the method. Thus, the embodiments of the system are only described briefly and reference can be made to the embodiments of the method for further details.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

While the embodiments of the present invention have been described above, the scope of the present invention is not limited thereto. Various modifications and alternatives can be made by those skilled in the art without departing from the scope of the present disclosure. These modifications and alternatives are to be encompassed by the scope of the present invention which is only defined by the claims as attached.

What is claimed is:

1. A method for residual image test, comprising:
   playing a residual image test picture on a display panel;
   applying a first fixed level signal to a pixel electrode of the display panel after playing the residual image test picture on the display panel;
   disconnecting a data line from the pixel electrode by turning off all gate lines and then applying a second fixed level signal to the data line, until a potential level of the data line becomes a second fixed level:
   floating the data line; and
   connecting the data line with the pixel electrode by turning on all gate lines on the display panel, such that the data line outputs a signal corresponding to the potential information of the pixel electrode.

2. The method of claim 1, wherein the second fixed level signal is a common voltage signal, and the first fixed level signal is a ground voltage signal.

3. The method of claim 1, wherein said applying the first fixed level signal to the pixel electrode of the display panel comprises:
   applying the first fixed level signal to the pixel electrode via the data line by turning on all gate lines on the display panel.

4. The method of claim 1, wherein the residual image test picture has a consistent color in a direction along which the data line extends.

5. The method of claim 1, wherein the first fixed level signal is applied to the pixel electrode of the display panel by:
   configuring the display panel to play a gray scale image in which all pixels have the same gray scale value or an all-black image.

6. A method for residual image cancellation, comprising:
   Step S1: obtaining potential information of a pixel electrode using the method of residual image test according to claim 1; and
   Step S2: adjusting a gray scale voltage based on the obtained potential information.

7. The method of claim 6, wherein Step S1 and Step S2 are performed repeatedly until the potential information of the pixel electrode satisfies a predetermined condition, and
   the potential information of the pixel electrode satisfying the predetermined condition comprises: a difference between a potential level of the pixel electrode and a first fixed level satisfying a predetermined value.

8. The method of claim 6, wherein
   Step S2 comprises:
   calculating the difference between the potential level of the pixel electrode and the first fixed level by comparing the obtained potential information with the first fixed level signal; and
   adjusting the gray scale voltage by: decreasing the gray scale voltage by the difference when the potential level of the pixel electrode is higher than the first fixed level, or increasing the gray scale voltage by the difference when the potential level of the pixel electrode is lower than the first fixed level.

9. The method of claim 6, wherein, in Step S2, the gray scale voltage is adjusted by adjusting γ-voltage.

10. An apparatus for residual image test, comprising:
    a playing unit configured to play a residual image test picture on a display panel;
    an applying unit configured to, after playing the residual image test picture on the display panel, apply a first fixed level signal to a pixel electrode of the display panel, disconnect a data line from the pixel electrode by turning off all gate lines and then applying a second fixed level signal to the data line, until a potential level of the data line becomes a second fixed level, and float the data line; and an obtaining unit configured to connect the data line with the pixel electrode by turning on all gate lines on the display panel, such that the data line outputs a signal corresponding to the potential information of the pixel electrode.

11. The apparatus of claim 10, wherein the second fixed level signal is a common voltage signal, and the first fixed level signal is a ground voltage signal.

12. The apparatus of claim 10, wherein the residual image test picture has a consistent color in a direction along which the data line extends.

13. The apparatus of claim 12, wherein the applying unit is further configured to apply to the display panel a gray scale image in which all pixels have the same gray scale value or an all-black image.

14. An apparatus for residual image cancellation, comprising:
the apparatus for residual image test according to claim 10; and
a gray scale voltage adjusting unit configured to adjust a gray scale voltage based on the potential information obtained by the apparatus for residual image test.

15. The apparatus of claim 14, further comprising:
a terminating unit configured to turn off the apparatus for residual image test and the gray scale voltage adjusting unit when the potential information of the pixel electrode satisfies a predetermined condition,
wherein the potential information of the pixel electrode satisfying the predetermined condition comprises: a difference between a potential level of the pixel electrode and a first fixed level satisfying a predetermined value.

16. The apparatus of claim 14,
wherein the gray scale voltage adjusting unit comprises:
a comparing module configured to calculate a difference between the potential level of the pixel electrode and a first fixed level by comparing the obtained potential information with the first fixed level signal; and
a gray scale voltage adjusting module configured to decrease the gray scale voltage by the difference when the potential level of the pixel electrode is higher than the first fixed level, or increase the gray scale voltage by the difference when the potential level of the pixel electrode is lower than the first fixed level.

* * * * *